United States Patent
Mori et al.

(10) Patent No.: US 11,159,533 B2
(45) Date of Patent: Oct. 26, 2021

(54) RELAY APPARATUS

(71) Applicant: ALAXALA Networks Corporation, Kanagawa (JP)

(72) Inventors: Shunsuke Mori, Kawasaki (JP); Keigo Uchizumi, Kawasaki (JP); Hikaru Hoshino, Kawasaki (JP)

(73) Assignee: ALAXALA NETWORKS CORPORATION, Kawasaki (JP)

(*) Notice: Subject to any disclaimer, the term of this patent is extended or adjusted under 35 U.S.C. 154(b) by 619 days.

(21) Appl. No.: 16/019,580

(22) Filed: Jun. 27, 2018

(65) Prior Publication Data
US 2019/0028479 A1    Jan. 24, 2019

(30) Foreign Application Priority Data
Jul. 19, 2017  (JP) .............................. JP2017-140035

(51) Int. Cl.
*H04L 29/06*     (2006.01)
*H04L 12/741*    (2013.01)

(52) U.S. Cl.
CPC ............ *H04L 63/101* (2013.01); *H04L 45/74* (2013.01); *H04L 63/0227* (2013.01); *H04L 63/0281* (2013.01); *H04L 63/14* (2013.01)

(58) Field of Classification Search
CPC ............... H04L 63/101; H04L 63/0227; H04L 63/0281; H04L 63/14; H04L 63/1441; H04L 45/74
See application file for complete search history.

(56) References Cited

U.S. PATENT DOCUMENTS

| 6,970,924 B1* | 11/2005 | Chu ..................... H04L 41/5067 709/224 |
| 7,873,731 B1* | 1/2011 | Leavy .................. H04L 63/1416 709/225 |
| 8,955,123 B2* | 2/2015 | Huang ................ H04L 61/1511 726/23 |

(Continued)

FOREIGN PATENT DOCUMENTS

| JP | 2005-228177 A | 8/2005 |
| JP | 2009-239525 A | 10/2009 |

(Continued)

*Primary Examiner* — Linglan E Edwards
(74) *Attorney, Agent, or Firm* — Mattingly & Malur, PC

(57) ABSTRACT

A relay apparatus for relaying data in a network comprises: a storage configured to store therein a whitelist in which normal information is registered, the normal information indicating that said data is normal based on a destination and source thereof; a receiver configured to receive first data; a determining part configured to determine whether normal information for the first data received is registered in the whitelist or not; a rewriting part configured to rewrite, when the determining part determines that the whitelist does not have normal information of the first data, a remaining lifespan required to reach the destination of the first data to a prescribed lifespan required to reach a specific communication apparatus that exists between the nearest communication apparatus and the furthest communication apparatus from the relay apparatus in the network; and a transmitter configured to transmit the first data that has gone through a rewriting process.

9 Claims, 11 Drawing Sheets

(56) References Cited

U.S. PATENT DOCUMENTS

| | | | |
|---|---|---|---|
| 9,319,304 B2* | 4/2016 | Zhang | H04L 45/021 |
| 9,369,434 B2* | 6/2016 | Kim | H04L 63/0227 |
| 2008/0168558 A1* | 7/2008 | Kratzer | H04L 63/20 |
| | | | 726/23 |
| 2009/0320131 A1* | 12/2009 | Huang | H04L 61/2076 |
| | | | 726/23 |
| 2011/0246772 A1* | 10/2011 | O'Connor | H04L 63/12 |
| | | | 713/168 |
| 2014/0215051 A1* | 7/2014 | Schlack | H04L 67/289 |
| | | | 709/224 |
| 2015/0067764 A1* | 3/2015 | Kim | H04L 63/101 |
| | | | 726/1 |
| 2017/0063861 A1 | 3/2017 | Uchizumi et al. | |
| 2017/0237749 A1* | 8/2017 | Wood | H04L 63/145 |
| | | | 726/23 |
| 2018/0337932 A1* | 11/2018 | Juster | H04L 63/20 |

FOREIGN PATENT DOCUMENTS

| | | | |
|---|---|---|---|
| JP | 2015-050767 A | 3/2015 | |
| JP | 2017-046149 A | 3/2017 | |

* cited by examiner

RELAY APPARATUS

CLAIM OF PRIORITY

The present application claims priority from Japanese patent application JP 2017-140035 filed on Jul. 19, 2017, the content of which is hereby incorporated by reference into this application.

BACKGROUND

The present invention relates to a relay apparatus that relays data.

In recent years, a safeguard against an attacker who intrudes a network in a critical infrastructure such as a power plant and takes over the control of the system is needed. The network of the critical infrastructure is protected by a firewall device or anti-virus software or the like installed in a terminal of a personal computer. However, there still is a need for a more secure measure to prevent an attacker who attempts to take over the control of the system. Examples of a method to mitigate the risk caused by the intrusion of an attacker include a use of the whitelist function. The whitelist function is to enhance the security level by registering normal terminal information included in normal in-communication information that flows through the network in a whitelist storage device, and blocking any abnormal communications other than communications from normal terminals registered in the whitelist storage device.

Prior art documents of this technique include Japanese Patent Application Laid-open Publication No. 2015-050767, Patent Application Laid-open Publication No. 2017-046149, Patent Application Laid-open Publication No. 2017-046149, and Japanese Patent Application Laid-open Publication No. 2005-228177. Japanese Patent Application Laid-open Publication No. 2015-050767 describes that "a network switch includes: a whitelist monitoring part that has stored therein a whitelist including allowable communication rules and that monitors at least one packet input through a plurality of switch interfaces based on the whitelist, the whitelist monitoring part allowing communications of packets that comply with the whitelist; and a whitelist management part that updates the whitelist and sends the whitelist to the whitelist monitoring part." (See Abstract)

Japanese Patent Application Laid-open Publication No. 2009-239525 describes that "a packet filtering device receives a packet sent from an SIP server, determines whether the received packet is a response to a verification request sent from the SIP client at a prescribed time interval, and if the packet is a response to a verification request and if sender information of the packet is not stored in a whitelist, obtains and stores the sender information of the packet in the whitelist. If network congestion is detected, the packet filtering device receives packets on the network, and transfers the packets that have the sender information thereof stored in the whitelist before transferring the packets that do not have the sender information thereof stored in the whitelist, among the received packets." (See Abstract)

Patent Application Laid-open Publication No. 2017-046149 describes that "receiving control information of the first data and a plurality of types of header information of the first data received by the first data receiver, and based on the priority level of the first data receiver group to which the first data receiver belongs, which is indicated by the priority information, and the storage condition indicating the number of entries of the whitelist that can be stored in the whitelist storage first memory, selecting at least one parameter from the plurality of types of header information of the first data, and adding, to the whitelist, an entry including the control information of the first data and at least one parameter that was selected." (See Abstract)

Japanese Patent Application Laid-open Publication No. 2005-228177. describes that "the unauthorized access log data obtaining part obtains unauthorized access log data from an unauthorized access log file, and after an unauthorized access log data analyzing and processing part conducts an analysis process, the diagnosis result match processing part evaluates the level of vulnerability of the unauthorized access that was identified to have a high alarm level in the unauthorized access log data based on the signature diagnosis correspondence table stored in the signature diagnosis correspondence table storage and the security evaluation result table stored in the security evaluation result storage, and adjusts the alarm level based on the evaluation result on the vulnerability, and thereafter, the alarm level adjusting part issues an alarm based on the adjusted alarm level." (See Abstract)

Although the whitelist described above has auxiliary operations such as taking a log or sending mirror packet, the main function thereof is to decide whether the packet is to be allowed through or to be discarded. However, in some cases, checking if the packet is registered in the list or not is not enough to determine whether the packet should be allowed through or discarded. Examples of such cases include an emergency packet that is not registered in the list. In order to prevent such a packet from being discarded, there is a method to allow through an unregistered packet after taking a log. In this method, an unauthorized packet, which has never been identified before, is detected, but not immediately blocked.

If a terminal inside of the protected network is infected by this unauthorized packet, the virus may spread into the protected network from this compromised terminal. In some cases, in order to contain the virus, all of the packets of the compromised terminal are deleted from the whitelist and discarded based on the attacker packet information provided by a monitoring appliance that monitors the network. However, not all of the packets from the compromised terminal are the attacker packet, but because the communication is completely stopped and normal packets are discarded, for a control network for monitoring and controlling the operation of devices, the entire system would significantly be affected.

SUMMARY

The present invention is aiming at relaying data in a secure and flexible manner.

An aspect of the invention disclosed in this application is a relay apparatus for relaying data in a network, comprising: a storage configured to store therein a whitelist in which normal information is registered, the normal information indicating that said data is normal based on a destination and source thereof; a receiver configured to receive first data; a determining part configured to determine whether normal information for the first data received by the receiver is registered in the whitelist or not; a rewriting part configured to rewrite, when the determining part determines that the whitelist does not have normal information of the first data, a remaining lifespan required to reach the destination of the first data to a prescribed lifespan required to reach a specific communication apparatus that exists between the nearest communication apparatus and the furthest communication apparatus from the relay apparatus in the network; and a transmitter configured to transmit the first data that has gone through a rewriting process by the rewriting part.

According to the representative embodiments of the present invention, it is possible to realize secure and flexible data relay. Other features, aspects, and advantages of the subject matter will become apparent from the description, the drawings, and the claims.

DETAILED DESCRIPTION OF THE EMBODIMENT

Embodiment 1

A relay apparatus of Embodiment 1 is disposed in a protected network. When the relay apparatus receives a packet that is not registered in the whitelist, the relay apparatus rewrites the TTL (time to live) value of the received packet to a prescribed value. In the process of setting the whitelist, the relay apparatus registers the greatest hop number in the protected network as the TTL value to be rewritten. When receiving a packet that is not registered in the whitelist, the relay apparatus rewrites the TTL value to the registered value, and transfers the packet. Thus, the communication range of the packet transferred from the relay apparatus is limited to the protected network.

<Configuration Example of Relay Apparatus>

Figure 1:
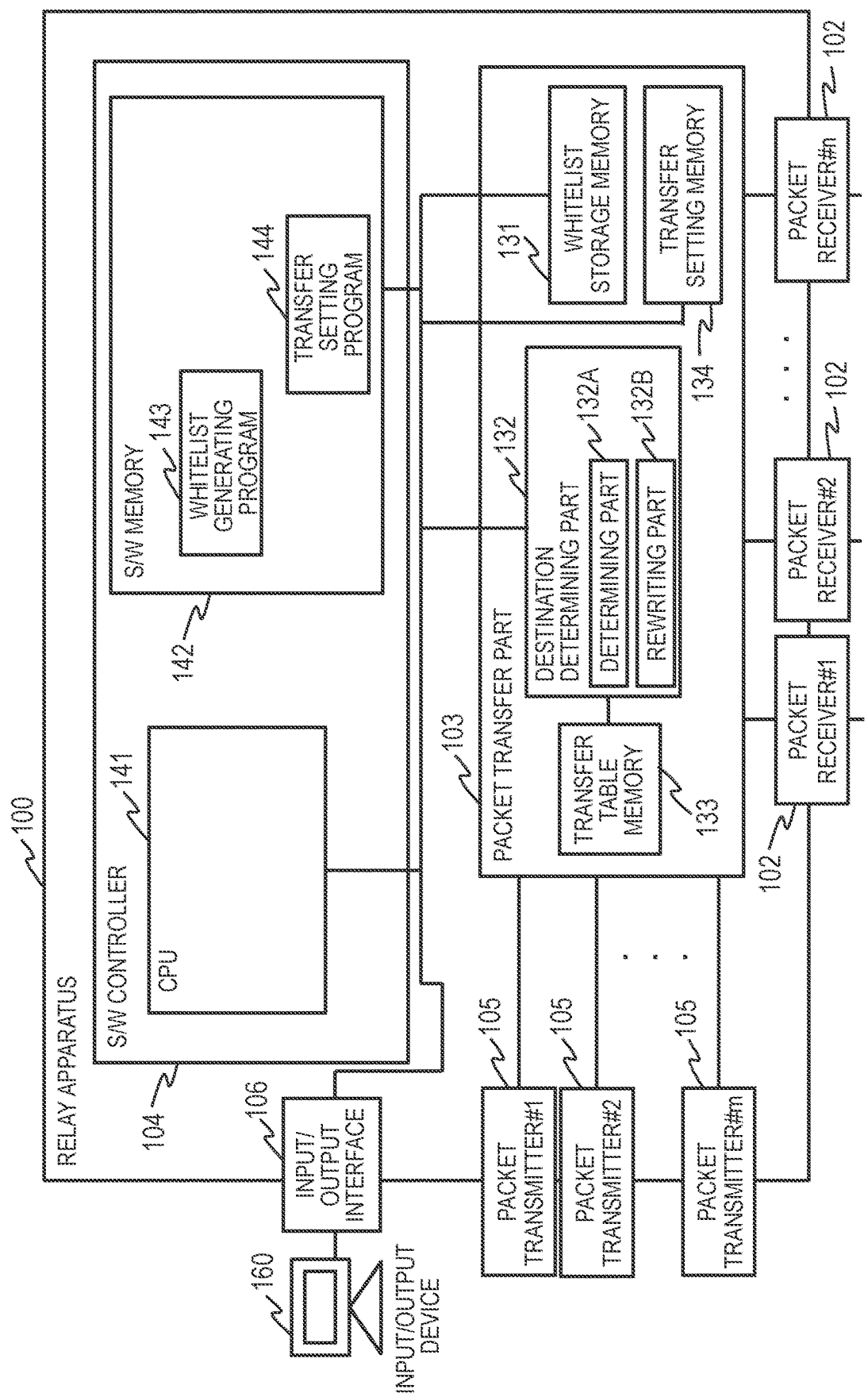
FIG. 1 is a block diagram showing a configuration example of a relay apparatus that relays a packet, which is an example of data.

FIG. 1 is a block diagram showing a configuration example of a relay apparatus that relays a packet, which is an example of data. A relay apparatus 100 is an example of the communication apparatus. The relay apparatus 100 relays packets and generates a whitelist. The whitelist is a list of packets that are allowed to be transferred by the relay apparatus 100, for example. The relay apparatus 100 includes a plurality of packet receivers 102, a packet transfer part 103, an S/W (software) controller 104, a plurality of packet transmitters 105, and an input/output interface 106, for example.

The respective packet receivers 102 are connected to external devices such as terminals or other relay apparatuses via communication lines such as metal cables or optical cables, and receive packets from the connected external devices. Each of the packet receivers 102 has a receiver number that uniquely identifies a packet receiver 102.

After receiving a packet, each of the packet receivers 102 adds control information corresponding to the packet receiver 102 (such as a packet receiver number or VLAN (virtual local area network) number) to the packet. The control information indicates a packet receiver group made up of at least one packet receiver 102. Examples of the control information given by the packet receiver 102 include the packet receiver number of the packet receiver 102, and the VLAN number that is an identifier of the VLAN to which the packet receiver 102 belongs.

The packet transfer part 103 receives packets from the packet receivers 102, and transfers or discards the received packets according to the whitelist generated by the S/W controller 104. The S/W controller 104 generates a whitelist. The respective packet transmitters 105 are connected to external devices such as terminals or other relay apparatuses via communication lines such as metal cables or optical cables, and transmit the packets received from the packet transfer part 103 to the connected external devices.

The packet receivers 102 and the packet transmitters 105 are generally constituted of hardware. In FIG. 1, the packet receivers 102 and the packet transmitters 105 are separate parts, but alternatively a packet transmitter-receiver having the functions of the packet receiver 102 and the packet transmitter 105 may be used.

The input/output interface 106 is connected to an input/output device 160. The input/output interface 106 receives an input from a user through the input/output device 160. The input/output interface 106 also outputs performance results of the programs or the like to the input/output device 160. The input/output device 160 includes a keyboard, mouse, or the like as an input device for receiving an input from users, and a display device, printer, or the like as an output device that presents the processing results of the relay apparatus 100 to users.

In FIG. 1, the input/output device 160 is shown as a device independent of the relay apparatus 100, but the relay apparatus 100 may be equipped with the input/output device 160 such as a display, operation buttons, or the like.

The packet transfer part 103 includes a whitelist storage memory 131, a destination determining part 132, a transfer table memory 133, and a transfer setting memory 134. Examples of the whitelist storage memory 131 include a CAM (content addressable memory) and DRAM (dynamic random access memory), and the whitelist storage memory 131 stores therein a whitelist generated by the S/W controller 104.

The transfer table memory 133 is CAM or DRAM, for example, and stores therein corresponding information that indicate the correspondence relationship between packet header information (such as Mac address, IP address, protocol, and port number) and the destination of the packet, i.e., the packet transmitter 105. This corresponding information is created by an administrator or the like, and stored in the transfer table memory 133 in advance. Examples of the information indicating the correspondence relationship include a mac address table used for the communications of Layer 2 of the OSI (open systems interconnection) reference model and a routing table used for the communications of Layer 3 of the OSI reference model.

The transfer setting memory 134 is a DRAM, for example, and stores therein transfer setting information 300 indicating the status of the relay apparatus 100 as well as the operation for whitelist unregistered packets, which will be described later. The transfer setting information 300 stored in the transfer setting memory 134 is configured by an administrator through the input/output device 160.

The destination determining part 132 receives a packet from each packet receiving part 102, and by searching the transfer table memory 133 based on the header information of the received packet, determines the destination of the received packet.

When the destination determining part 132 receives a packet during the whitelist operating state, which will be described later, the destination determining part 132 functions as a determining part 132A configured to search the whitelist stored in the whitelist storage memory 131, and determine whether the received packet is a packet registered in the whitelist. If the received packet is not registered in the whitelist, the destination determining part 132 functions as a rewriting part 132B configured to conduct, on the packet, a process (allowing through the packet, discarding the packet, or rewriting the TTL value) specified by the operation setting for a whitelist unregistered packet, which is stored in the transfer setting memory 134.

If the destination determining part 132 receives a packet during the whitelist generating state, which will be described below, the destination determining part 132 extracts prescribed header information (such as Mac address, IP address, protocol, or port number) and prescribed control information (such as the packet transmitter number or VLAN number), and sends such information to the S/W controller 104. The destination determining part 132 conducts several processes to determine whether or not communications using the whitelist need to be performed, or the like, based on the setting content of the transfer setting memory 134.

The packet transfer part 103 is generally constituted of hardware in order to perform simple commands rapidly such as rapid search on the whitelist or communications at the wire-speed of packets. The packet transfer part 103 may be constituted of FPGA (Field Programmable Gate Array) or the like, for example.

The S/W controller 104 includes a CPU (control processing unit) 141 and an S/W memory 142. The CPU 141 includes a processor that conducts programs stored in the S/W memory 142. The S/W memory 142 includes a ROM (read only memory) that is a non-volatile storage element, and a RAM (random access memory) that is a volatile storage element.

ROM stores therein non-variable programs (such as BIOS (basic input/output system)) and the like. RAM is a high-speed volatile storage element such as a DRAM, and temporarily stores programs for the processor to run and data used for running the programs.

The S/W memory 142 includes a whitelist generating program 143 and a transfer setting program 144. The programs stored in the S/W memory 142 are run by the CPU 141 (processor), and as a result, a prescribed process is performed using storage devices, communication ports (communication devices), and the like. Thus, in this specification, if "program" is the subject of the sentence, the term "program" may be replaced with "CPU 141." A process conducted by a program is a process conducted by a computer or computing system that runs the program.

The CPU 141 operates in accordance with the programs, thereby operating as a function part that realizes a prescribed function. For example, when the CPU 141 operates in accordance with the whitelist generating program 143, the CPU 141 functions as a whitelist generating part, and when the CPU 141 operates in accordance with the transfer setting program 144, the CPU 141 functions as a transfer setting part. The CPU 141 also operates as a function part that realizes each of a plurality of processes conducted by respective programs. The computer and computing system are a device and system that include those function parts.

The whitelist generating program 143 generates a whitelist (will be described in detail with reference to FIG. 2) based on the control information and header information received from the destination determining part 132, and writes the whitelist into the whitelist storage memory 131. The transfer setting program 144 writes, in the transfer setting memory 340, the transfer settings input through the input/output device 160.

<Example of Whitelist>

Figure 2:
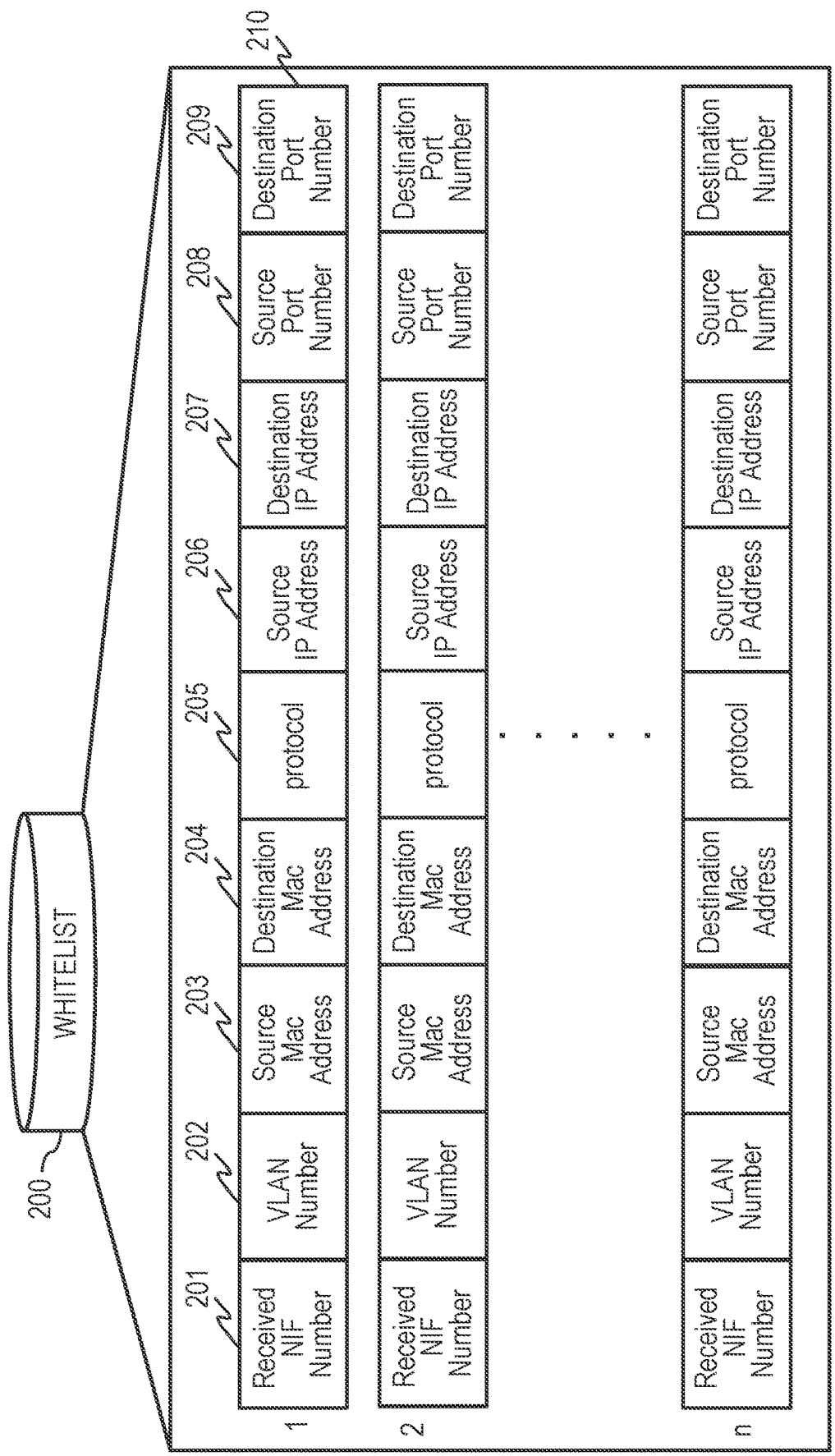
FIG. 2 is a diagram showing an example of the whitelist stored in the whitelist storage memory of Embodiment 1.

FIG. 2 is a diagram showing an example of the whitelist stored in the whitelist storage memory 131 of Embodiment 1. In the example of FIG. 2, the whitelist 200 includes n number of entries. Each entry of the whitelist 200 includes a plurality of parameters. The plurality of parameters are each control information or header information that was extracted by the destination determining part 132 from the packet received through the packet receiver 102. Thus, each entry of the whitelist 200 is normal packet information that identifies normal packet relayed by the relay apparatus 100. That is, by the entry registered in the whitelist 200, a normal communication path is identified.

The entry 210 is an example of an entry included in the whitelist 200. The entry 210 includes a packet receiver number 201 and a VLAN number 202, which are parameters respectively indicating the control information of the packet, for example. The entry 210 each includes, as parameters indicating the header information of the packet, source mac address 203, destination mac address 204, protocol 205, source IP address 206, destination IP address 207, source port number 208, and destination port number 209.

The packet receiver number 201 uniquely identifies each packet receiver 102. A packet receiver 102 that has received a packet is identified based on the packet receiver number 201. The VLAN number 202 uniquely identifies VLAN to which the packet receiver 102 belongs.

Source mac address 203 indicates the source mac address of a packet. Destination mac address 204 indicates the destination mac address of a packet. Protocol 205 indicates the protocol type. Source IP address 206 indicates the source IP address of a packet. Destination IP address 207 indicates the destination IP address of a packet. Source port number 208 indicates the source port number of a packet. Destination port number 209 indicates the destination port number of a packet.

The entry 210 is not limited to the example of FIG. 2, and may include at least one parameter that indicates the control information, and a plurality of types of parameters that indicate the header information. The entry 210 may also include header information such as TOS (type of service), flag, TTL (time to live), ID, version, and header values in addition to or in place of the header information described above.

<Example of Transfer Setting Information>

Figure 3:
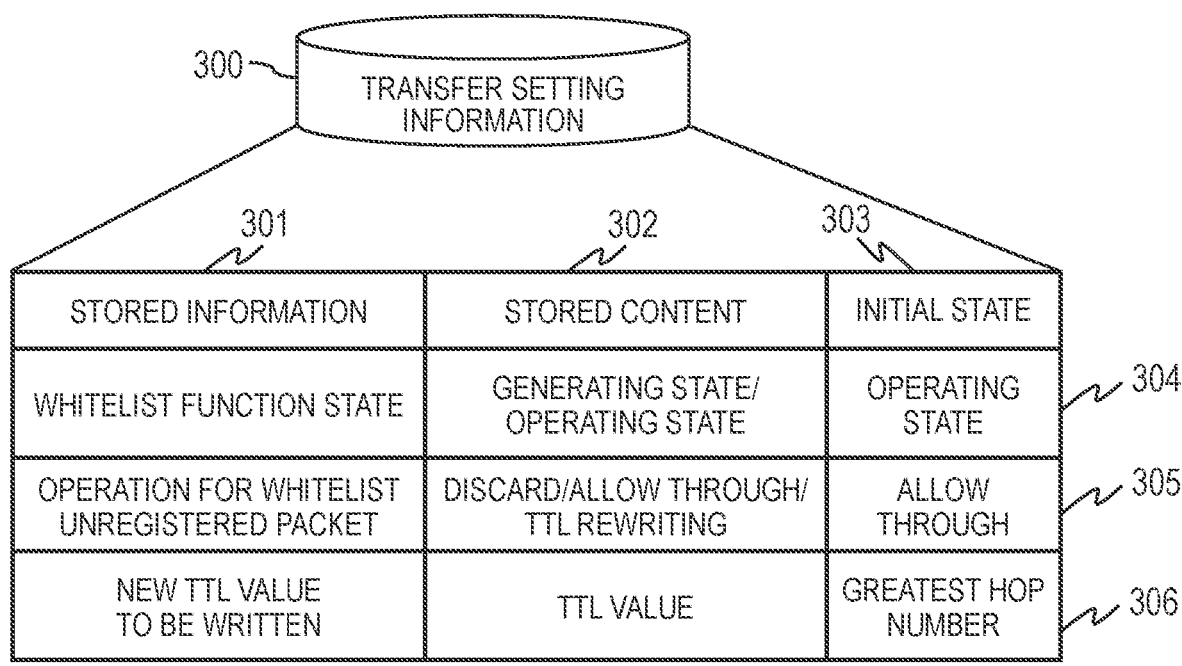
FIG. 3 is a diagram showing an example of the transfer setting information stored in the transfer setting memory.

FIG. 3 is a diagram showing an example of the transfer setting information stored in the transfer setting memory 134. The transfer setting information 300 includes stored information 301 that indicates the type of transfer settings, stored content 302 that indicates the state of the stored information 301, and an initial state 303 that indicates the initial state of the stored content 302. In FIG. 3, each cell of the stored content 302 has a plurality of values separated by / , but in the actual configuration, one of those plurality of values is stored. The initial state 303 stores therein one of the plurality of values written in the corresponding stored content 302.

In the record 304, the stored content 301 is the whitelist function, the stored content 302 is the generating state/operating state, and the initial state 303 is the operating state.

In the record 305, the stored content 301 is the operation for a whitelist unregistered packet, the stored content 302 is discard/allow through/TTL rewrite, and the initial state 303 is "allow through."

In the record 306, the stored content 301 is the TTL value to be rewritten, the stored content 302 is the TTL value, and the initial state 303 is the greatest hop number. The greatest hop number is the greatest value of the hop number of the shortest route from the relay apparatus 100 to a relay apparatus that is located at the border between the protected network and an unprotected network. Thus, because the packet with the TTL value rewritten by the value of the stored content 302 exists within the protected network, the packet reaches a terminal within the protected network. If the TTL value becomes zero due to transfer, the packet is discarded within the protected network, and will not be transferred to an unprotected network.

It is possible to set the TTL value of the storage content 302 to a hop number smaller than the greatest hop number. For example, the TTL value may be the smallest hop number (the smallest value of the hop numbers of the shortest route from the relay apparatus 100 to a relay apparatus that is located at the border between the protected network and an unprotected network). This way, because the packet with the TTL value rewritten with the value of the stored content 302 exists within the protected network, the packet reaches a terminal within the protected network. When the TTL value becomes zero due to transfer, this packet is discarded in the protected network. As a result, this packet will not be transferred to an unprotected network.

Thus, the greater the TTL value of the stored content 302 is, the more likely that the packet reaches a terminal in the protected network, but it is also possible that the packet reaches a terminal in an unprotected network. On the other hand, the smaller the TTL value of the stored content 302 is, the less likely that the packet is transferred to a terminal in an unprotected network while it is possible to reach a terminal in the protected network. However, there is a chance that the packet cannot reach a terminal in the protected network. This means that, if the usability is to be improved by making it easier for the packet to reach a terminal in the protected network, the TTL value of the stored content 302 needs to be greater, and if more secure operation is desired, the TTL value of the stored content 302 needs to be smaller.

Below, an example of the operation of the relay apparatus 100 in accordance with the transfer setting information 300 will be explained. When the destination determining part 132 receives a packet, the destination determining part 132 refers to the transfer setting memory 134 to determine whether the stored content 302 of the record 304 is the generating state for generating a whitelist, or the operating state for transferring packets using the whitelist.

Below, an operation example when the stored content 302 of the record 304 is the generating state will be explained. The destination determining part 132 conducts a packet transfer process on the received packet, and sends prescribed header information and prescribed control information of the received packet to the whitelist generating program 143, which is run by the CPU 141. The CPU 141 runs the whitelist generating program 143 so as to generate a whitelist 200 based on the control information and header information received from the destination determining part 132, and writes the generated information into the whitelist storage memory 131.

Below, an operation example when the stored content 302 of the record 304 is the operating state will be explained. The destination determining part 132 determines whether the packet received through the packet receiver 102 is registered in the whitelist 200 stored in the whitelist storage memory 131 or not. If the packet is registered in the whitelist 200, the destination determining part 132 conducts a packet transfer process on the received packet.

If the packet is not registered in the whitelist 200, the destination determining part 132 refers to the transfer setting memory 143 and conducts a process indicated by the stored content 302 of the record 305 on the packet. Examples of the process indicated by the stored content 302 of the record 305 include discarding the packet, allowing through the packet, and transferring the packet.

<Example of Command List for Transfer Setting>

Figure 4:
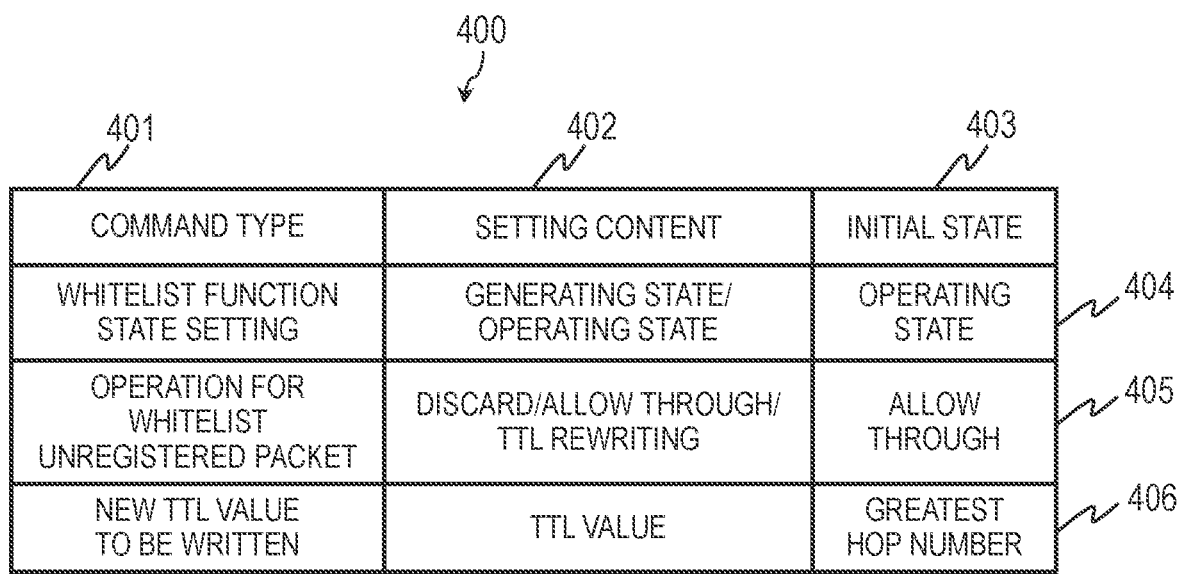
FIG. 4 is a diagram showing an example of a list of commands related to the transfer settings, which are received by the transfer setting program through the input/output device.

FIG. 4 is a diagram showing an example of a list of commands related to the transfer settings, which are received by the transfer setting program 144 through the input/output device 160. The list of commands related to the transfer settings 400 includes the command type 401 indicating the type of commands, the setting content 402 indicating the setting content of a command indicated by the command type 401, and the initial state 403 indicating the initial state of the setting content 402, for example. When the list of commands related to the transfer settings 400 is input into the relay apparatus 100, the transfer setting information 300 is configured.

The respective commands of records 404 to 406 are commands for changing respective transfer settings of the records 304 to 306. The command type 401, setting content 402, and initial state 403 of the records 404 to 406 respectively correspond to the stored information 301, stored content 302, and initial state 303 of the records 304 to 306 of the transfer setting memory 134.

<Example of Operation Procedures of Relay Apparatus>

Figure 5:
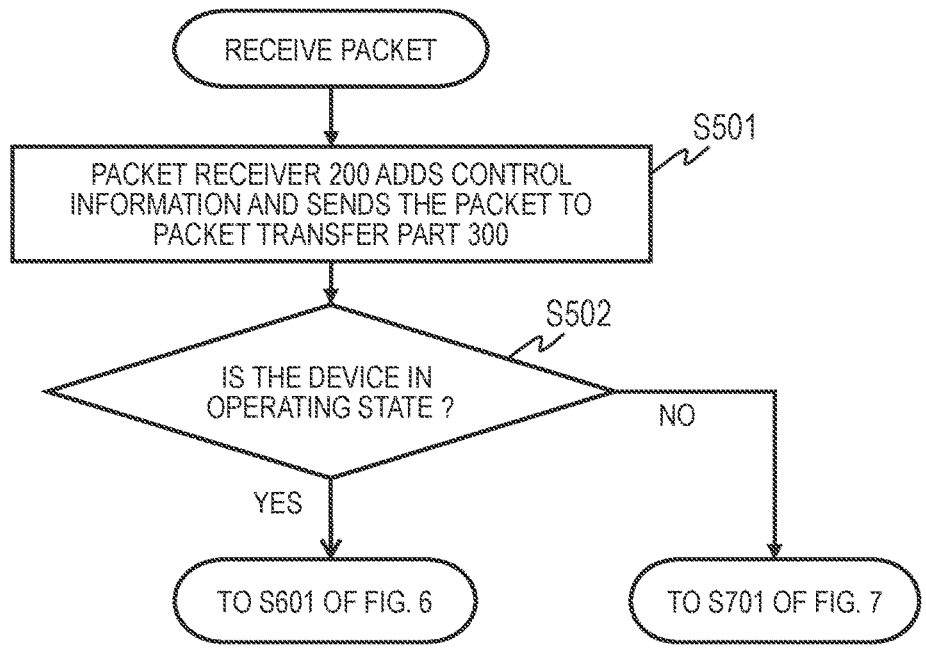
FIG. 5 is a flowchart showing an example of the operation procedures of the relay apparatus.

FIG. 5 is a flowchart showing an example of the operation procedures of the relay apparatus 100. Specifically, FIG. 5 shows an operation based on the setting content of the transfer setting memory 134 when a packet is received from outside, for example.

When any of the packet receivers 102 of the relay apparatus 100 receives a packet, the packet receiver 102 adds the control information described above to the received packet, and sends the packet to the destination determining part 132. After receiving the packet, the destination determining part 132 refers to the stored content 302 (generating state or operating state) of the record 304 in the transfer setting memory 134, and determines whether the stored content 302 is the generating state for generating a whitelist 200, or the operating state for transferring packets using the whitelist 200. If the stored content 302 is the generating state (Step S502: YES), the process moves to Step S601 of FIG. 6, which will be described later, and conducts a process to automatically generate the whitelist 200. If the stored content 302 is the operating state (Step S502: NO), the process moves to Step S701 of FIG. 7, which will be described later, and conducts a communication control process based on the generated whitelist 200.

The generating state and the operating state of the whitelist 200 are switched between each other by an input made by the administrator or the like through the input/output device 160. The generating state is a no-virus period such as when the network is configured, and during this non-virus period, normal communications are conducted and the whitelist 200 is automatically generated, and thereafter, the administrator changes the generating state to the operating state.

Figure 6:
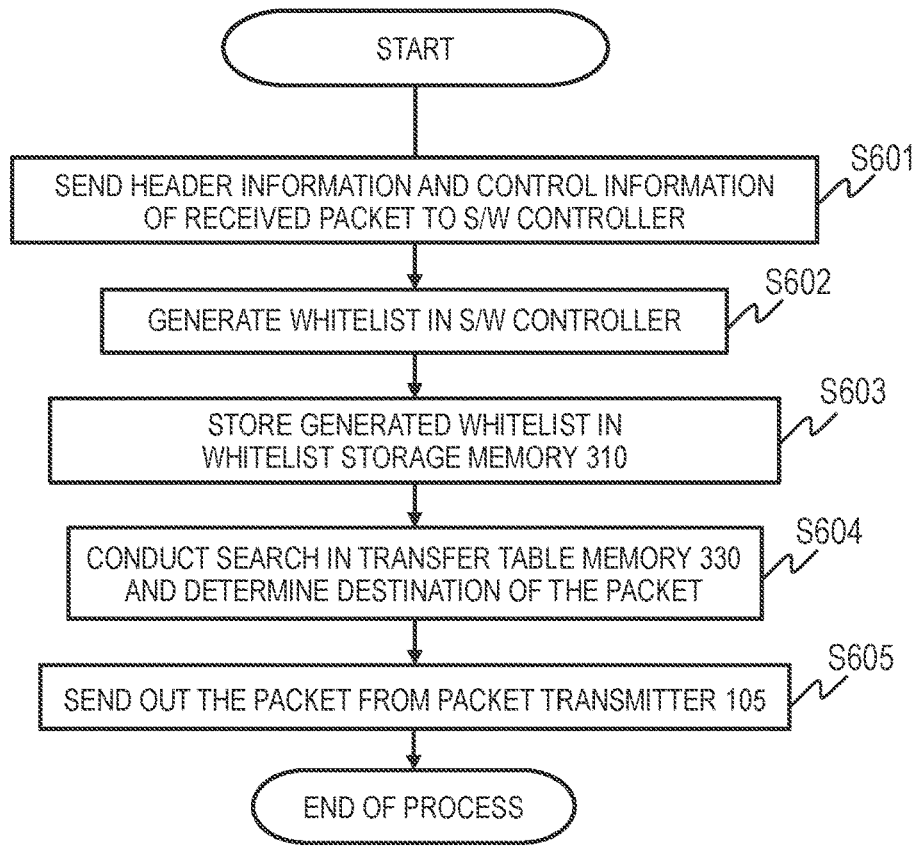
FIG. 6 is a flowchart showing an operation example when the stored content was the generating state in Step S502 of FIG. 5 (Step S502: YES).

FIG. 6 is a flowchart showing an operation example when the stored content 302 was the generating state in Step S502 of FIG. 5 (Step S502: YES). After receiving a packet, the destination determining part 132 sends the header and control information of the received packet to the S/W controller 104 (Step S601). After receiving the header and control information of the received packet, the S/W controller 104 causes the CPU 141 disposed therein to function as the whitelist generating part, and generates the whitelist 200 using the header and control information based on the information in FIG. 2 (Step S602).

Further, the CPU 141, which is functioning as the whitelist generating part, writes the generated whitelist 200 into the whitelist storage memory 340 (Step S603). The destination determining part 132 searches the transfer table memory 133 for the corresponding information using the header and control information of the received packet as the key, and determines the destination of the packet (Step S604). The packet transfer part 103 sends out the packet, which destination was determined by the destination determining part 132, from one of the packet transmitters 105 (Step S605), and ends the process.

Figure 7:
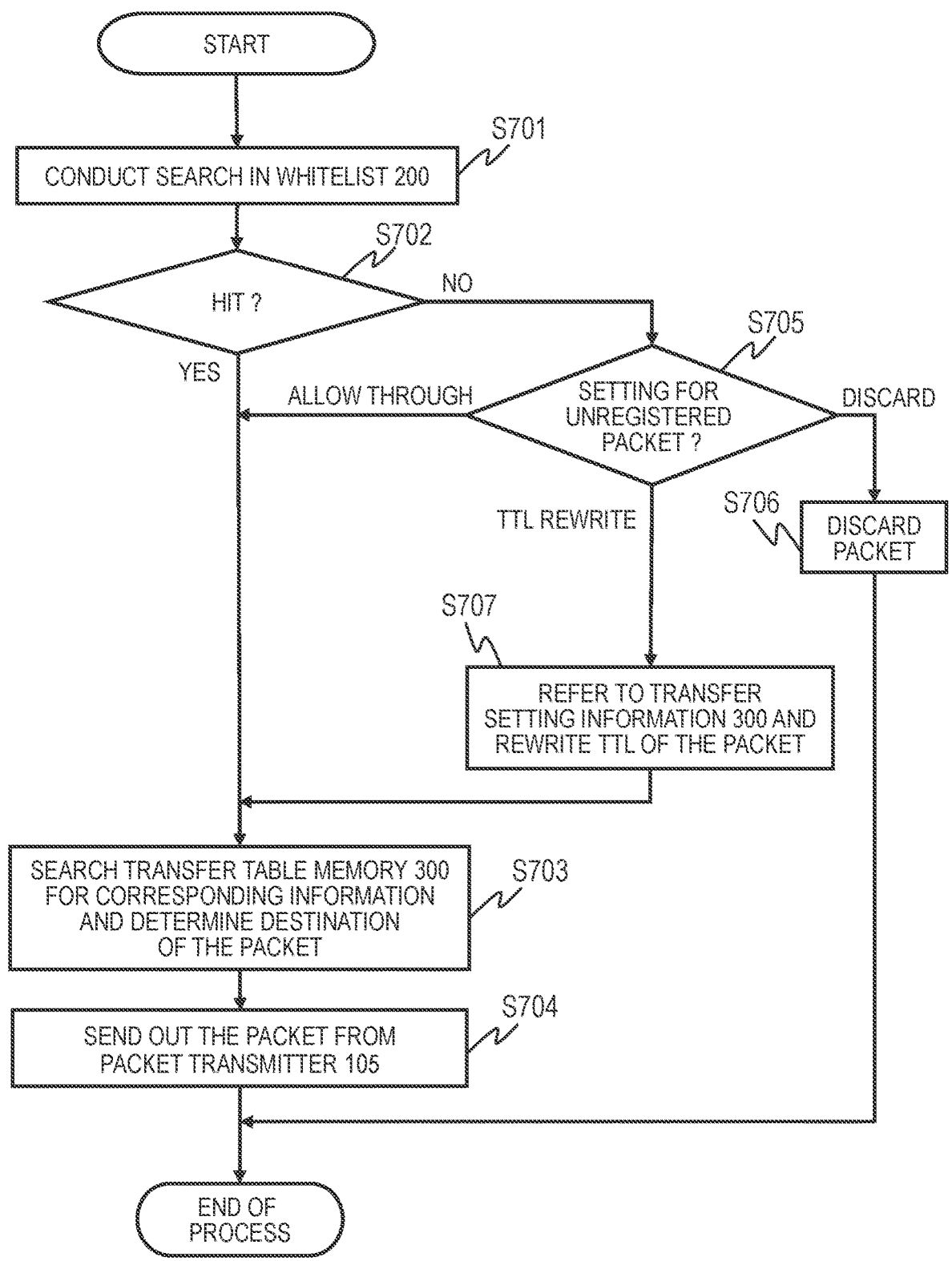
FIG. 7 is a flowchart showing an operation example when the stored content was the operating state in Step S502 of FIG. 5 (Step S502: NO).

FIG. 7 is a flowchart showing an operation example when the stored content 302 was the operating state in Step S502 of FIG. 5 (Step S502: NO). After receiving the packet, the destination determining part 132 conducts search in the whitelist 200 (Step S701). Then, the destination determining part 132 determines whether the header information and control information of the received packet are stored in the whitelist 200 and came up as a search hit or not (Step S702).

Below, the case where the information came up as a search hit in Step S702 (Step S702: YES) will be explained. The destination determining part 132 searches the transfer table memory 133 for the corresponding information using the header and control information of the received packet as the key, and determines the destination of the packet (Step S703). The packet transfer part 103 sends out the packet, which destination was determined by the destination determining part 132, from one of the packet transmitters 105 (Step S704), and ends the process.

Below, the case where the information did not come up as a search hit in Step S702 (Step S702: NO) will be explained. The destination determining part 132 refers to the stored content 302 of the record 305 in the transfer setting memory 134, and determines whether the stored content 302 is either "discard," "allow through," or "TTL rewrite" (Step S705). When the destination determining part 132 determines that the stored content 302 is "allow through" in Step S705 (Step S705: ALLOW THROUGH), the process moves to Step S703.

When the destination determining part 132 determines that the stored content 302 is "discard" in Step S705 (Step S705: DISCARD), the destination determining part 132 discards the packet (Step S706), and ends the process. When the destination determining part 132 determines that the stored content 302 is "TTL rewrite" in Step S705, the destination determining part 132 updates the TTL of the packet to the TTL value under the stored content 302 of the record 306 in the transfer setting information 300 (Step S707). Thereafter, the destination determining part 132 determines the destination based on the corresponding information of the transfer table memory 133 (Step S703), sends out the packet from the packet transmitter 105 (Step S704), and ends the process.

Packet Transfer Example

Figure 8:
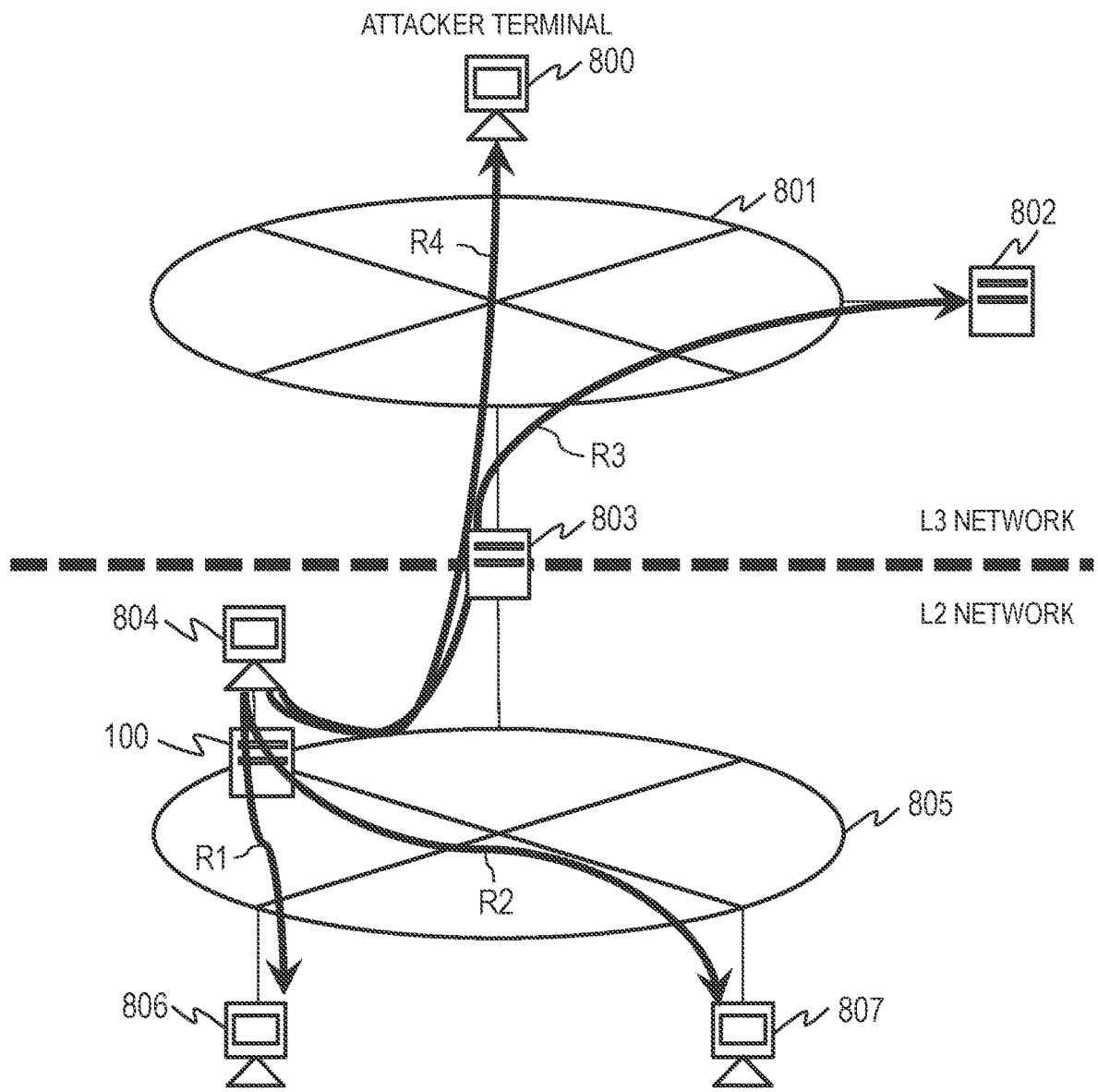
FIG. 8 is a diagram for explaining a packet transfer example according to Embodiment 1.

FIG. 8 is a diagram for explaining a packet transfer example according to Embodiment 1. Terminals 800 and 802 are provided in an unprotected network 801, which is a L3 network, for example. The unprotected network 801 includes other terminals than the terminals 800 and 802, but those other terminals are not shown in FIG. 8.

Terminals 804, 806, 807 and relay apparatus 100 and 803 are provided in the protected network 805, which is a L2 network, for example. The terminal 804 is connected to the packet receiver 102 and transmitter 105 of the relay apparatus 100. The relay apparatus 803 is disposed between the protected network 805 and unprotected network 801. FIG. 8 shows that the terminal 804 is connected to the relay apparatus 100, but the terminals 806 and 807 are also connected to a relay apparatus (not shown in the figure) in the protected network. The protected network 805 includes other terminals than the terminals 804, 806, and 807, and other relay apparatuses than the relay apparatus 100, but those are not shown in FIG. 8.

The whitelist storage memory 131 has registered therein an entry for identifying a packet from the terminal 804 to the terminal 806, an entry for identifying a packet from the terminal 806 to the terminal 804, an entry for identifying a packet from the terminal 804 to the terminal 802, and an entry for identifying a packet from the terminal 802 to the terminal 804. The terminal 800 is assumed to be a terminal of an attacker such as the C&C server.

The relay apparatus 100 registers the greatest hop number of the protected network 805 in the TTL value of the entry 306 (New TTL value to be rewritten) of the transfer setting information 300 in advance during the whitelist generating state. The relay apparatus 100 sets the stored content 302 of the entry 305 (operation for whitelist unregistered packet) to TTL rewrite.

Below, the operation when a packet is sent from the terminal 804 to the respective terminals 800, 802, 806, and 807 during the operating state (Step S502: NO) of the whitelist 200 in the relay apparatus 100 will be explained in detail.

[Route R1: Terminal 804 to Terminal 806]

When a packet was sent from the terminal 804 to the terminal 806, after the packet was received by the packet receiver 102 of the relay apparatus 100, the destination determining part 132 conducts search in the whitelist 200. An entry to identify the packet from the terminal 804 to the terminal 806 is registered in the whitelist 200. Thus, the relay apparatus 100 searches the transfer table memory 133 for the corresponding information, determines the destination, and sends out the packet from the packet transmitter 105. In this way, the terminal 806 can receive the packet sent from the terminal 804 and relayed by the relay apparatus 100.

[Route R2: Terminal 804 to Terminal 807]

When a packet was sent from the terminal 804 to the terminal 807, after the packet was received by the packet receiver 102 of the relay apparatus 100, the destination determining part 132 conducts search in the whitelist 200. An entry to identify the packet from the terminal 804 to the terminal 807 is not registered in the whitelist 200. Thus, the relay apparatus 100 refers to the transfer setting information 300, selects TTL rewrite, and rewrites the TTL to the registered TTL value. Thereafter, the relay apparatus 100 conducts search in the transfer table memory 133, determines the destination, and sends out the packet from the packet transmitter 105. Because the TTL value allows the packet to reach the terminal 807, the terminal 807 can receive the packet sent from the terminal 804 and relayed by the relay apparatus 100.

[Route R3: Terminal 804 to Terminal 802]

When a packet was sent from the terminal 804 to the terminal 802 of the unprotected network 801, after the packet was received by the packet receiver 102 of the relay apparatus 100, the destination determining part 132 conducts search in the whitelist 200. An entry to identify the packet from the terminal 804 to the terminal 802 is registered in the whitelist 200. Thus, the relay apparatus 100 conducts search in the transfer table memory 133, determines the destination, and sends out the packet from the packet transmitter 105. As described above, even though the terminal 802 is in the unprotected network 801, the terminal 802, which is registered in the whitelist 200, can receive a packet sent from the terminal 804 and relayed by the relay apparatus 100.

[Route R4: Terminal 804 to Terminal 800 (Attacker Terminal)]

When a packet was sent from the terminal 804 to the terminal 800 of the unprotected network 801, after the packet was received by the packet receiver 102 of the relay apparatus 100, the destination determining part 132 conducts search in the whitelist 200. A packet from the terminal 804 to the terminal 800 is not registered in the whitelist 200.

Thus, the relay apparatus 100 refers to the transfer setting information 300, selects TTL rewrite, and rewrites the TTL of the packet to the TTL value registered in the transfer setting information 300. Thereafter, the relay apparatus 100 searches the transfer table memory 133 for the corresponding information, determines the destination, and sends out the packet from the packet transmitter 105. On the way to the terminal 800, the TTL decreases due to the communication apparatus in the protected network 805, and when the packet reaches the relay apparatus 803, the TTL becomes zero, which causes the packet to be discarded. Therefore, the terminal 800 cannot receive a packet from the terminal 804. As a result, it is possible to shut down the communication with the terminal 800, which is the attacker terminal.

As described above, by shutting down the communication with the terminal 800, which is the attacker terminal, it is possible to prevent the virus from spreading within the protected network 805. On the other hand, even if a packet is not registered in the whitelist 200, the packet can still be communicated as long as the packet does not go beyond the protected network 805. This way, it is possible to ensure the security by the whitelist function while minimizing the effect on the system.

Embodiment 2

In Embodiment 2, the relay apparatus of Embodiment 1 is combined with a monitoring appliance that changes a part of the information of the whitelist 200 stored in the whitelist storage memory 131 to monitor the network. In Embodiment 2, differences from Embodiment 1 will be mainly explained, and therefore, the explanation of the same content as Embodiment 1 is omitted.

The relay apparatus 100 of Embodiment 2 rewrites the TTL value of each entry to a prescribed value for the respective packets registered in the whitelist. Also, the relay apparatus 100 registers the greatest hop number in the protected network 805 obtained from the relay apparatus 100 in the initial state 303 of the TTL value to be written of the transfer setting information 300, and sets the operation for whitelist unregistered packet of the transfer setting information 300 to "discard."

If the attacker packet notified by the monitoring appliance is registered in the whitelist during the operating state of the whitelist (Step S502: NO), the relay apparatus 100 either deletes or changes the entry of the whitelist depending on the degree of importance. For example, if the degree of importance is high, the relay apparatus 100 determines that the packet is an attack, and deletes the packet from the whitelist, and if the degree of importance is low, the relay apparatus 100 cannot determine that the packet is an attack or not, and therefore changes the TTL value of the packet to a prescribed value. This way, the attacker packet with the high degree of importance is discarded, and the packet with a low degree of importance is allowed through only within the protected network 805.

The monitoring appliance has the technique to issue an alarm of different levels in accordance with the degree of importance as described in Japanese Patent Application Laid-open Publication No. 2005-228177. According to Japanese Patent Application Laid-open Publication No. 2005-228177, if a terminal in the protected network 805 is infected, the monitoring appliance detects the infection by comparing with the pattern of an unauthorized packet, and issues an alarm on the level corresponding to the degree of importance. By deleting or changing the entry of the whitelist 200 based on the alarm, the relay apparatus 100 can shut down the communication between the protected network 805 and the attacker terminal. In general, the infected terminal is operated by commands from the attacker terminal, and therefore, by shutting down the communications with the attacker terminal, it is possible to prevent the virus from further spreading beyond the infected terminal.

<Example of Whitelist>

Figure 9:
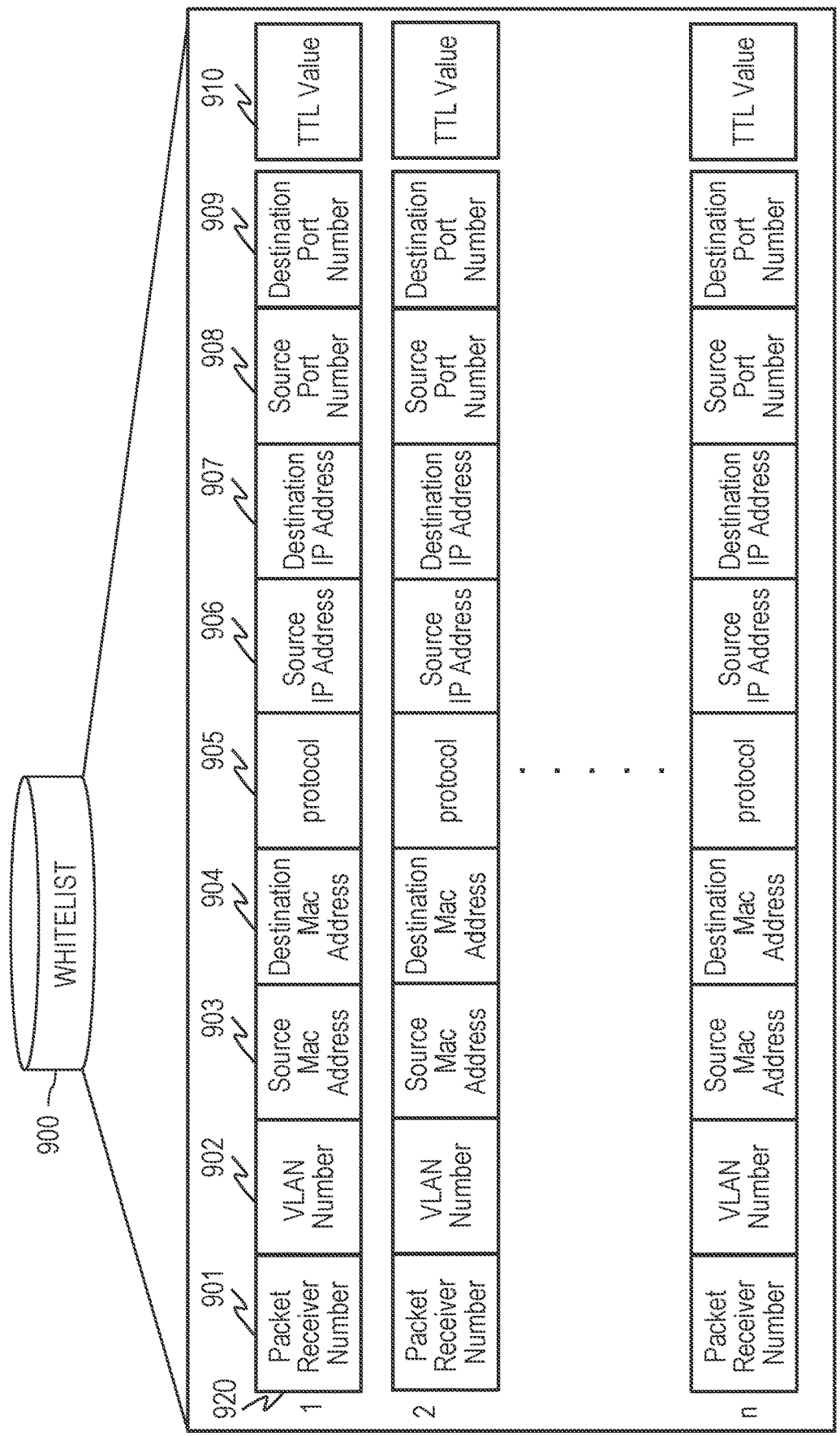
FIG. 9 is a diagram showing an example of the whitelist stored in the whitelist storage memory of Embodiment 2.

FIG. 9 is a diagram showing an example of the whitelist stored in the whitelist storage memory 131 of Embodiment 2. In the example of FIG. 9, the header information 901 to 909 of the entry 920 of the whitelist 900 is the same as the header information 201 to 209 of the entry 210 of the whitelist 200 of Embodiment 1. The TTL value 910 is a value to be newly written in the TTL of a packet matched with the entry. The TTL value 910 is set to the value of the entry 306 of the transfer setting information 300 (TTL value to be rewritten), or "0" to indicate that the TTL value is not to be rewritten. In Embodiment 2, "0" is used to indicate that the TTL value is not to be rewritten, but any other value may be used as long as it is not 1 to 255, which are possible values for the TTL value.

<Example of Notification Information>

Figure 10:
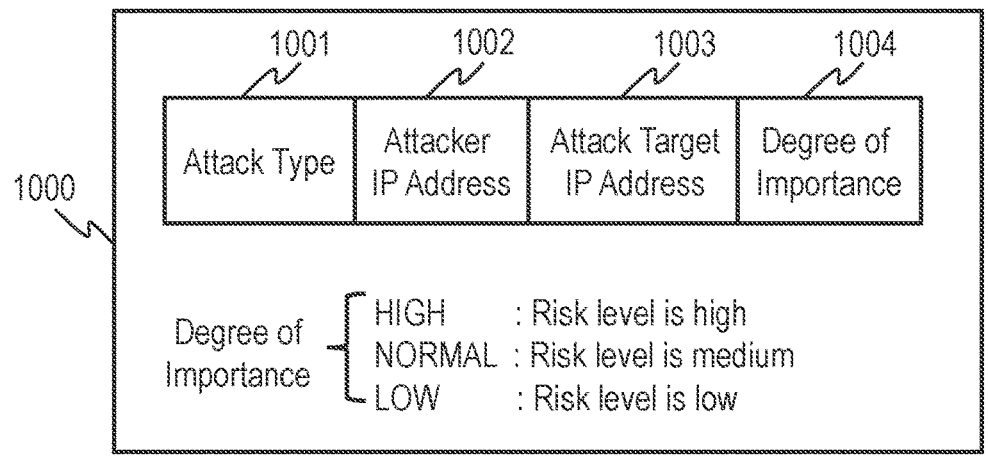
FIG. 10 is a diagram showing an example of notification information provided by the monitoring appliance to the relay apparatus of Embodiment 2.

FIG. 10 is a diagram showing an example of notification information provided by the monitoring appliance to the relay apparatus of Embodiment 2. The notification information 1000 includes attack type 1001, attacker IP address 1002, attack target IP address 1003, and level of importance 1004. Attack type 1001 is information indicating the type of attack such as DoS attack. Attacker IP address 1002 is information indicating the IP address of the attacker terminal. Attack target IP address 1003 is information indicating the IP address of a terminal that is the target of the attacker terminal. The level of importance 1004 is information indicating the risk level of the attack in three levels of "high," "normal," and "low." In Embodiment 2, the attacker IP address is used for the information identifying the attacker terminal, and the degree of importance is indicated as the risk level of attack, which is categorized in three levels, but the present invention is not limited to such, and any information may alternatively be used as long as it is possible to identify the attacker terminal and notify the degree of importance of the attack in different levels.

<Example of Operation Procedures>

Next, the operation procedures of the relay apparatus 100 will be explained. The flowchart of FIG. 5 is also applied to Embodiment 2. Thus, the process conducted for the generating state (Step S502: YES) will be explained with reference to FIG. 11, and the process conducted for the operation state (Step S502: NO) will be explained with reference to FIG. 12.

Figure 11:
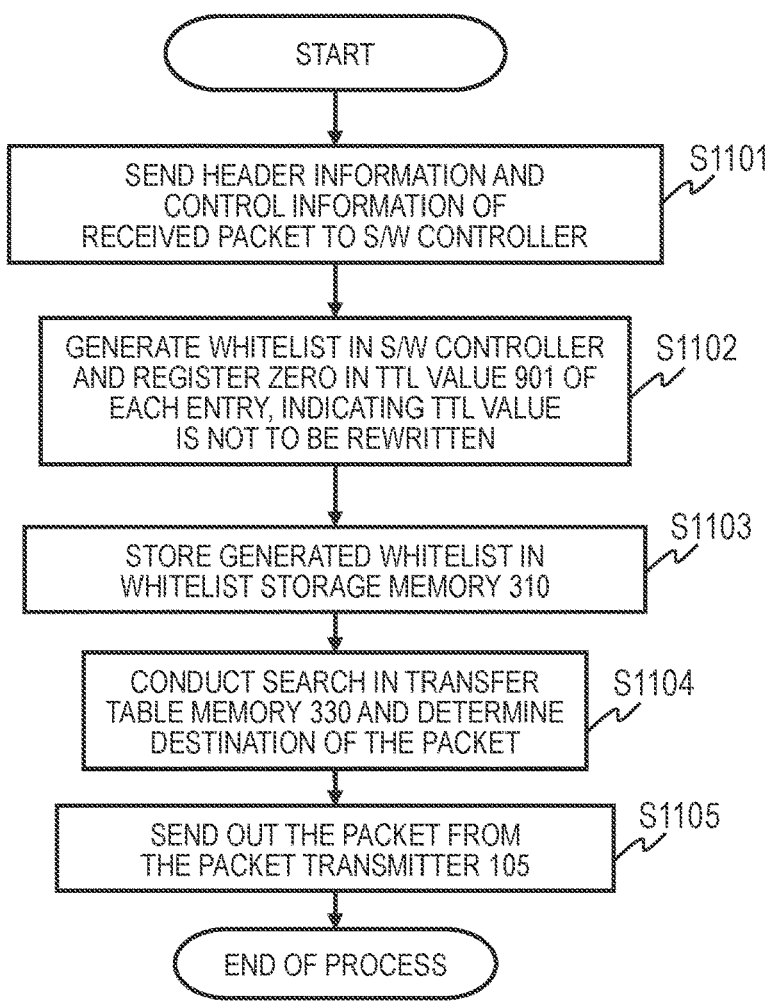
FIG. 11 is a flowchart showing the operation example when a packet is received during the whitelist generating state (Step S502: YES) of the relay apparatus of Embodiment 2.

FIG. 11 is a flowchart showing the operation example when a packet is received during the whitelist generating state (Step S502: YES) of the relay apparatus 100 of Embodiment 2. After receiving a packet, the destination determining part 132 sends the header and control information of the received packet to the S/W controller 104 (Step S1101). After receiving the header and control information of the received packet, the S/W controller 104 causes the CPU 141 disposed therein to function as the whitelist generating part, and generates the whitelist 900 using the header and control information based on the TTL value 910 of FIG. 9.

At this time, the relay apparatus 100 registers "0" in the TTL value 910 of each entry, which means that the TTL is not to be rewritten (Step S1102). The initial value of the TTL value 910 is "0," but the TTL value 910 is written to the value of the initial state 303 of the TTL value to be rewritten in the transfer setting information 300 (greatest hop number in the protected network 805 from the relay apparatus 100) in Step S1318 or S1313, which will be described below.

Further, the CPU 141, which is functioning as the whitelist generating part, writes the generated whitelist 900 into the whitelist storage memory 340 (Step S1103). The destination determining part 132 searches the transfer table memory 133 for the corresponding information using the header and control information of the received packet as the key, and determines the destination of the packet (Step S1104). The packet transfer part 103 sends out the packet, which destination was determined by the destination determining part 132, from one of the packet transmitters 105 (Step S1105), and ends the process.

Figure 12:
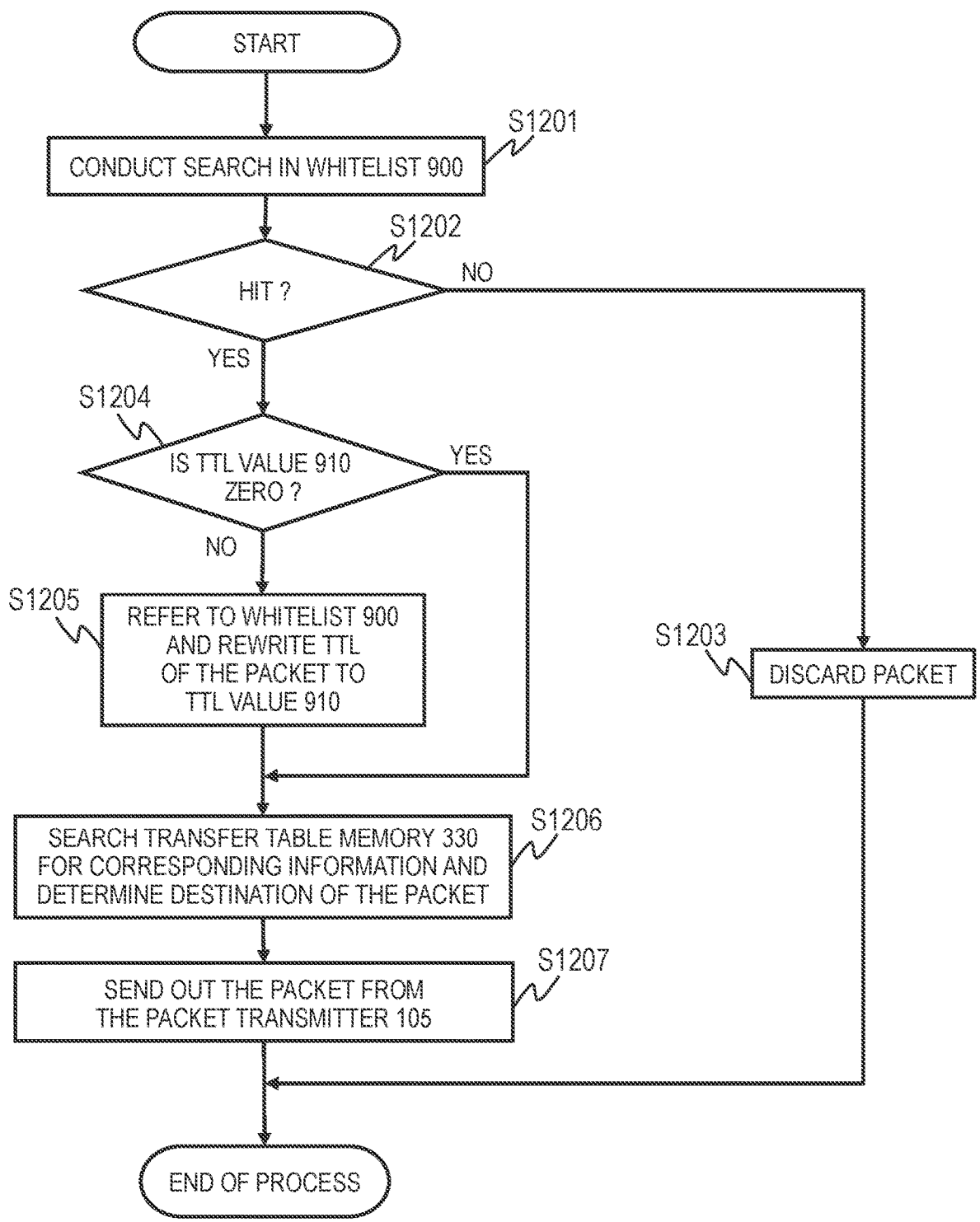
FIG. 12 is a flowchart showing the operation example when a packet is received during the operating state (Step S502: NO) of the relay apparatus of Embodiment 2.

FIG. 12 is a flowchart showing the operation example when a packet is received during the operating state (Step S502: NO) of the relay apparatus 100 of Embodiment 2. After receiving the packet, the destination determining part 132 conducts search in the whitelist 900 (Step S1201). Then, the destination determining part 132 determines whether the header information and control information of the received packet are stored in the whitelist 200 and came up as a search hit or not (Step S1202).

Below, the case where the information did not come up as a search hit in Step S1202 (Step S1202: NO) will be explained. In Embodiment 2, the operation for whitelist unregistered packet is set to "discard." Thus, according to the stored content 302 of the record 305 in the transfer setting memory 132, which is "discard," the destination determining part 132 discards the packet (Step S1203), and ends the process.

Below, the case where the information came up as a search hit in Step S1202 (Step S1202: YES) will be explained. The destination determining part 132 determines whether the TTL value 910 of the entry of the whitelist 900 that came up as a search hit is "0" or not (Step S1204). If the TTL value 910 is "0," (Step S1204: YES), the process moves to Step S1206.

On the other hand, if the TTL value 910 is not "0" (Step S1204: NO), the destination determining part 132 refers to the whitelist 900, and rewrites the TTL of the packet to the TTL value 910 (Step S1205). The destination determining part 132 searches the transfer table memory 133 for the corresponding information using the header and control information of the received packet as the key, and determines the destination of the packet (Step S1206). The packet transfer part 103 sends out the packet, which destination was determined by the destination determining part 132, from one of the packet transmitters 105 (Step S1207), and ends the process.

Figure 13:
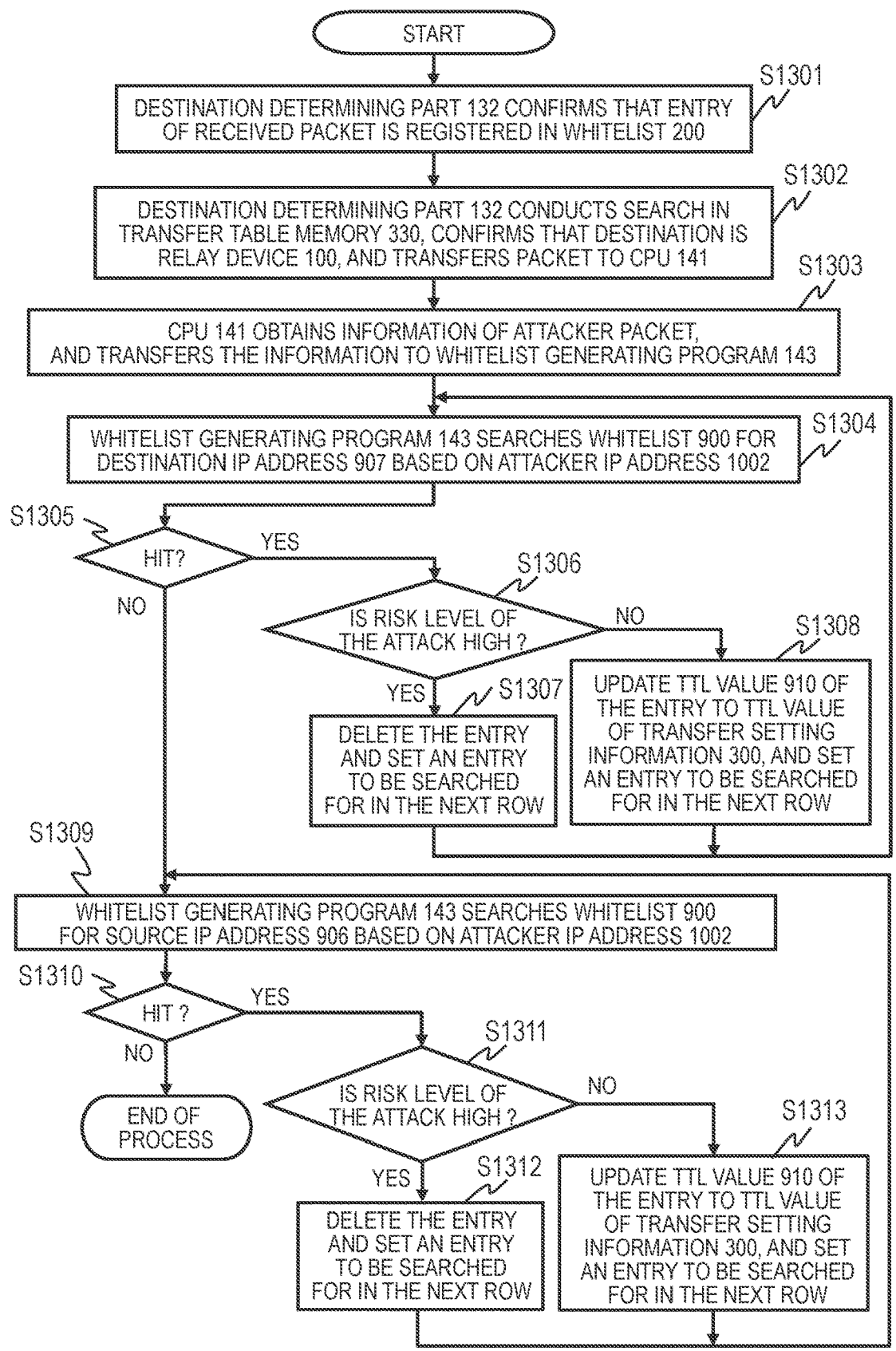
FIG. 13 is a flowchart showing the operation example when the information of attacker packet is obtained from the monitoring appliance during the whitelist generating state (Step S502: NO) of the relay apparatus of Embodiment 2.

FIG. 13 is a flowchart showing the operation example when the information of attacker packet is obtained from the monitoring appliance during the whitelist generating state (Step S502: NO) of the relay apparatus 100 of Embodiment 2. This flowchart is started when the relay apparatus 100 receives a packet including the information of the attacker packet from the monitoring appliance.

First, the destination determining part 132 conducts search in the whitelist 900 stored in the whitelist storage memory 131, and confirms that the entry identifying the packet received from the packet receiver 102 is registered in the whitelist 900 or not (Step S1301). Because this packet is from the monitoring appliance, the destination determining part 132 determines that this packet is registered in the whitelist 900.

Next, the destination determining part 132 searches the transfer table memory 133 for the corresponding information, identifies that the destination of the received packet is the relay apparatus 100, and transfers the received packet to the CPU 141 (Step S1302).

The CPU 141 obtains, from the received packet sent from the monitoring appliance, the attacker terminal IP address for the information to identify the attacker terminal and the degree of importance, which is high, normal, or low, and transfers the obtained information (attacker packet information) to the whitelist generating program 143 (Step S1303).

The whitelist generating program 143 uses the entry in the first row of the whitelist 900 as the search target entry, and searches the destination IP address 907 of the search target entry for the attacker terminal IP address (Step S1304). In Step S1304, after the search on the search target entry is completed, the whitelist generating program 143 uses the entry in the next row as the search target entry, and continues the search until the destination IP address 907 that matches the attacker terminal IP address is found in the search target entry.

The whitelist generating program 143 determines whether any entry in the whitelist 900 comes up as a search hit (matches) or not (Step S1305). That is, the whitelist generating program 143 determines whether the destination IP address 907 that matches the attacker terminal IP address is found in the current search target entry or not.

When an entry came up as a search hit (Step S1305: YES), the whitelist generating program 143 checks the degree of importance of the attacker packet information obtained in Step S1303 (Step S1306).

If the degree of importance is high (Step S1306: YES), the whitelist generating program 143 deletes the entry that came up as a search hit in Step S1305 from the whitelist 900 (Step S1307).

On the other hand, if the degree of importance is normal or low (Step S1306: NO), the whitelist generating program 143 updates the TTL value 910 of the entry that came up as a search hit in the whitelist 900 to the TTL value of the entry 306 (TTL value to be rewritten) in the transfer setting information 300, which is stored in the transfer setting memory 134 (Step S1308).

After Step S1307 or Step S1308, the search target entry is moved to an entry in the next row of the entry that came up as a search hit, and the process is returned to Step S1304. This process is repeated until no entry comes up as a search hit in Step S1305. If no entry comes up as a search hit (Step S1305: NO), or when the search is completed for the entry of the last row of the whitelist 900, the process moves to Step S1309.

In Step S1309, the whitelist generating program 143 uses the entry in the first row of the whitelist 900 as the search target entry, and searches the source IP address 906 of the search target entry for the attacker terminal IP address (Step S1309). In Step S1309, after the search on the search target entry is completed, the whitelist generating program 143 uses the entry in the next row as the search target entry, and continues the search until the source IP address 906 that matches the attacker terminal IP address is found in the search target entry.

The whitelist generating program 143 determines whether any entry in the whitelist 900 comes up as a search hit (matches) or not (Step S1310). That is, the whitelist generating program 143 determines whether the source IP address 906 that matches the attacker terminal IP address is found in the current search target entry or not.

When an entry came up as a search hit (Step S1310: YES), the whitelist generating program 143 checks the degree of importance of the attacker packet information obtained in Step S1303 (Step S1311).

If the degree of importance is high (Step S1311: YES), the whitelist generating program 143 deletes the entry that came up as a search hit in Step S1310 from the whitelist 900 (Step S1312).

On the other hand, if the degree of importance is normal or low (Step S1311: NO), the whitelist generating program 143 updates the TTL value 910 of the entry that came up as a search hit in the whitelist 900 to the TTL value of the transfer setting information 300, which is stored in the transfer setting memory 134 (Step S1313).

After Step S1312 or Step S1313, the search target entry is moved to an entry in the next row of the entry that came up as a search hit, and the process is returned to Step S1309. This process is repeated until no entry comes up as a search hit in Step S1310. If no entry comes up as a search hit (Step S1310: NO), or when the search is completed for the entry of the last row of the whitelist 900, the process is ended.

In Embodiment 2, the whitelist generating program 143 conducts search using the attacker terminal IP address included in a packet notified by the monitoring appliance, but any other information that can identify the attacker terminal may also be used. In Embodiment 2, if the degree of importance in the attacker packet information notified by the monitoring appliance is high, the packet is discarded, and if the degree of importance is normal or low, the TTL is rewritten, but the combinations of the degrees of importance and "discard packet" or "TTL rewrite" are not limited to those of Embodiment 2. The whitelist generating state is a non-virus period such as a configuration process of the network, and because the notification from the monitoring appliance on an attacker terminal is invalid, there is no need to take actions on the notification.

<Packet Transfer Example>

Figure 14:
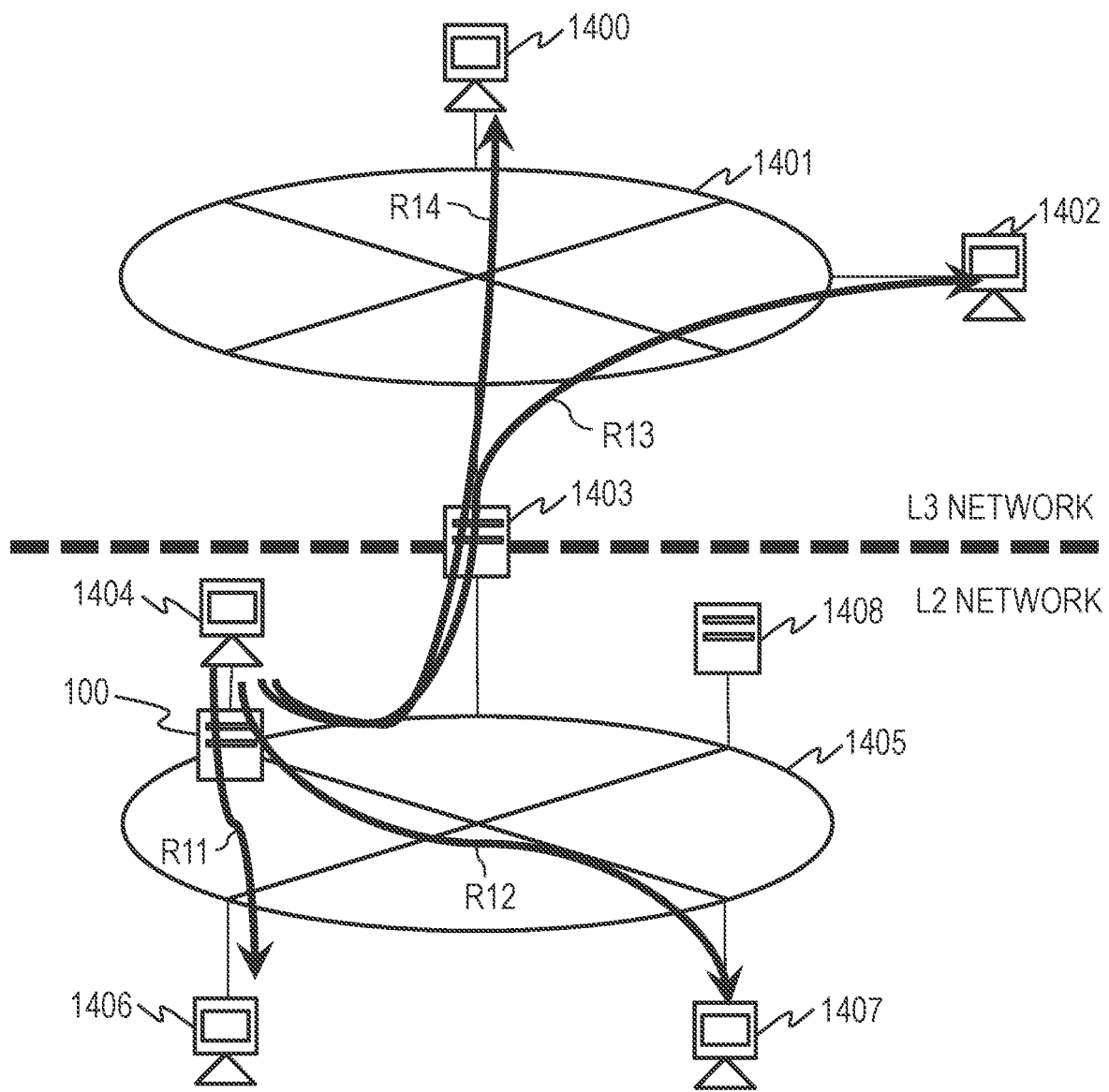
FIG. 14 is a diagram for explaining a packet transfer example according to Embodiment 2.

FIG. 14 is a diagram for explaining a packet transfer example according to Embodiment 2. Terminals 1400 and 1402 are provided in an unprotected network 1401, which is a L3 network, for example. The unprotected network 1401 includes other terminals than the terminals 1400 and 1402, but those other terminals are not shown in FIG. 14.

Terminals 1404, 1406, 1407 and relay apparatus 100 and 1403 are provided in a protected network 1405, which is a L2 network, for example. The terminal 1404 is connected to the packet receiver 102 and transmitter 105 of the relay apparatus 100. The relay apparatus 1403 is disposed between the protected network 1405 and the unprotected network 1401. FIG. 14 shows that the terminal 1404 is connected to the relay apparatus 100, but the terminals 1406 and 1407 are also connected to a relay apparatus (not shown in the figure) in the protected network 1405. The protected network 1405 includes other terminals than the terminals 1404, 1406, and 1407, and other relay apparatuses than the relay apparatus 100, but those are not shown in FIG. 14.

The whitelist 900 stored in the whitelist storage memory 131 of the relay apparatus 100 has registered therein an entry for identifying a packet from the terminal 1404 to the terminal 1406, an entry for identifying a packet from the terminal 1406 to the terminal 1404, an entry for identifying a packet from the terminal 1404 to the terminal 1407, an entry for identifying a packet from the terminal 1407 to the terminal 1404, an entry for identifying a packet from the terminal 1404 to the terminal 1402, and an entry for identifying a packet from the terminal 1402 to the terminal 1404. The terminal 1400 is a terminal of the attacker (attacker terminal) such as a C&C server, and the terminal 1408 is a terminal in which the monitoring appliance is operated (will be referred to as a monitoring appliance terminal 1408).

The relay apparatus 100 registers the greatest hop number of the protected network 1405 in the TTL value of the transfer setting information 300 in advance during the process to configure the whitelist 900. The relay apparatus 100 sets the stored content 302 of the entry 305 (operation for whitelist unregistered packet) to "discard."

When the monitoring appliance terminal 1408 determines that the terminal 1402 of the unprotected network 1401 is an attacker terminal, the monitoring appliance terminal 1408 sends, to the relay apparatus 100, the attacker packet information including the IP address (attacker terminal IP address) of the terminal 1402 and the degree of importance, which is high. The CPU 141 of the relay apparatus 100 obtains the attacker packet information from the monitoring appliance terminal 1408, and transfers the information to the whitelist generating program 143.

As shown in FIG. 12, the whitelist generating program 143 conducts search in the whitelist 900 based on the attacker terminal IP address, and looks for an entry having the destination IP address or source IP address that matches the attacker terminal IP address. Thereafter, the whitelist generating program 143 checks the degree of importance of the attack, which is included in the attacker packet information. Because the degree of importance is high, the whitelist generating program 143 deletes the entry that came up as a search hit from the whitelist 900. The whitelist generating program 143 searches all entries in the whitelist 900, and ends the process when no entry comes up as a search hit anymore.

When the monitoring appliance terminal 1408 determines that the terminal 1407 of the protected network 1405 is an attacker terminal, the monitoring appliance terminal 1408 sends, to the relay apparatus 100, the attacker packet information including the IP address (attacker terminal IP address) of the terminal 1407 and the degree of importance, which is low. The CPU 141 of the relay apparatus 100 obtains the attacker packet information from the monitoring appliance terminal 1408, and transfers the information to the whitelist generating program 143.

As shown in FIG. 12, the whitelist generating program 143 conducts search in the whitelist 900 based on the attacker terminal IP address, and looks for an entry having the destination IP address or source IP address that matches the attacker terminal IP address. Thereafter, the whitelist generating program 143 checks the degree of importance of the attack, which is included in the attacker packet information. Because the degree of importance is low, the whitelist generating program 143 rewrites the TTL value 910 of the entry that came up as a search hit in the whitelist 900 to the TTL value of the transfer setting information 300. The whitelist generating program 143 searches all entries in the whitelist 900, and ends the process when no entry comes up as a search hit anymore.

Below, the operation when a packet is sent from the terminal 1404 of the protected network 1405 to the respective terminals 1400, 1402, 1406, and 1407 during the operating state (Step S502: NO) of the whitelist 900 will be explained in detail.

[Route R11: Terminal 1404 to Terminal 1406]

When a packet was sent from the terminal 1404 to the terminal 1406, after the packet was received by the packet receiver 102 of the relay apparatus 100, the destination determining part 132 conducts search in the whitelist 900. An entry to identify the packet from the terminal 1404 to the terminal 1406 is registered in the whitelist 900. Because "0" is registered in TTL value 910, the relay apparatus 100 does not conduct a process to rewrite the TTL. Thereafter, the relay apparatus 100 searches the transfer table memory 133 for the corresponding information, determines the destination, and sends out the packet from the packet transmitter 105. In this way, the terminal 1406 can receive the packet sent from the terminal 1404 and relayed by the relay apparatus 100.

[Route R12: Terminal 1404 to Terminal 1407]

When a packet was sent from the terminal 1404 to the terminal 1407, after the packet was received by the packet receiver 102 of the relay apparatus 100, the destination determining part 132 conducts search in the whitelist 900. An entry to identify the packet from the terminal 1404 to the terminal 1407 is registered in the whitelist 900. Because a value other than "0" is registered in the TTL value 910, the relay apparatus 100 rewrites the TTL value of the packet to the registered TTL value 910.

Thereafter, the relay apparatus 100 searches the transfer table memory 133 for the corresponding information, determines the destination, and sends out the packet from the packet transmitter 105. Because the TTL value of the packet after rewriting is the greatest hop number of the protected network 1405, the packet can reach the terminal 1407. As described above, even when the packet was identified as an attacker packet by the monitoring appliance terminal 1408, if the degree of importance is low, the packet can be communicated within the protected network 1405.

[Route R13: Terminal 1404 to Terminal 1402]

When a packet was sent from the terminal 1404 to the terminal 1402, after the packet was received by the packet receiver 102 of the relay apparatus 100, the destination determining part 132 conducts search in the whitelist 900. The packet from the terminal 1404 to the terminal 1402 is not registered in the whitelist 900, and therefore, the relay apparatus 100 refers to the transfer setting information 300, and discards the packet. As described above, when the packet was identified as an attacker packet by the monitoring appliance terminal 1408, and if the degree of importance is high, the packet is discarded before reaching the terminal 1402. This makes it possible to shut down the communication of the attacker packet.

[Route R14: Terminal 1404 to Terminal 1400]

When a packet was sent from the terminal 1404 to the terminal 1400, after the packet was received by the packet receiver 102 of the relay apparatus 100, the destination determining part 132 conducts search in the whitelist 900. The packet from the terminal 1404 to the terminal 1400 is not registered in the whitelist 900, and therefore, the relay apparatus 100 refers to the transfer setting information 300 again, and discards the packet. As a result, the communication to the terminal 1400 is shut down.

As described above, even if a packet is from the terminal registered in the whitelist 900 in the protected network 1405, if the packet is identified as an attack with a high degree of importance by the monitoring appliance terminal 1408, the packet is discarded, and if the packet is identified as an attack with a low degree of importance, the packet is not discarded immediately, and sent to another terminal within the protected network 1405.

When a terminal inside of the protected network 1405 is infected, and the infected terminal attacks other terminals, the infected terminal operates based on commands from the external attacker terminal. Therefore, by shutting down the external communications, it is possible to prevent the virus from spreading beyond the infected terminal. On the other hand, because it is possible to carry on the communications of the packet within the protected network 1405, the impact on the system can be reduced. This way, it is possible to ensure the security utilizing the whitelist function while minimizing the effect on the system.

As described above, the relay apparatus 100 can ensure the network security with the whitelist function while minimizing the impact on the system, which allows the relay apparatus 100 to relay packets in a flexible manner that cannot be achieved by the conventional configuration where there are only two choices, which are "discard" and "allow through." Specifically, according to Embodiment 1, for example, the relay apparatus 100 is configured to allow through a packet not registered in the whitelist 200 as long as it stays within the protected network 805, but discard such a packet before reaching the unprotected network 801. According to Embodiment 2, the relay apparatus 100 is configured to allow through a packet from the potentially harmful terminal that is registered in the whitelist 900 as long as it stays within the protected network 1405, but discard such a packet before reaching the unprotected network 1401. If the destination of a packet that is not registered in the whitelist 200 or 900 is a terminal in the protected network 805 or 1405, the relay apparatus 100 may be configured not to rewrite the TTL. In this case, the relay apparatus 100 has stored therein a list of IP addresses of the terminals within the protected network 805 or 1405, and if the list has an IP address that matches the destination IP address of a packet, the relay apparatus 100 does not rewrite the TTL value of the packet. This makes it possible to prevent problems such as a packet not reaching the destination due to an insufficient hop number or being sent out to the unprotected network 801 or 1401 due to an excessive hop number.

It should be noted that this invention is not limited to the above-mentioned embodiments, and encompasses various modification examples and the equivalent configurations within the scope of the appended claims without departing from the gist of this invention. For example, the above-mentioned embodiments are described in detail for a better understanding of this invention, and this invention is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A relay apparatus for relaying data in a protected network, comprising:
   a storage configured to store therein a whitelist in which normal information is registered, the normal information indicating that said data is normal based on a destination and source thereof and a transfer setting information in which a prescribed lifespan is registered, the prescribed lifespan indicating any hop number from a smallest hop number to a greatest hop number in hop numbers of a shortest route from the relay apparatus to another relay apparatus that is located at a border between a protected network and an unprotected network;
   a receiver configured to receive first data;
   a processor configured to:
   determine whether first normal information for the first data received by the receiver is registered in the whitelist or not; and
   rewrite, when determining that the whitelist does not have the first normal information of the first data, a first remaining lifespan required to reach the destination of the first data to the prescribed lifespan in the transfer setting information; and
   a transmitter configured to transmit the first data that has gone through a rewriting process by the processor.

2. The relay apparatus according to claim 1, wherein the prescribed lifespan indicates the greatest hop number.

3. The relay apparatus according to claim 1, wherein the prescribed lifespan indicates the smallest hop number.

4. The relay apparatus according to claim 1, wherein, when a destination of the first data is a communication apparatus within the network, the processor does not rewrite the first remaining lifespan, and
   wherein the transmitter transmits the first data that has not gone through a rewriting process by the processor.

5. The relay apparatus according to claim 1,
   wherein the processor is further configured to, when determining that first normal information for the first data is registered in the whitelist, not rewrite the first remaining lifespan, and
   wherein the transmitter transmits the first data that has not gone through a rewriting process by the processor.

6. The relay apparatus according to claim 1,
   wherein the storage stores therein attack information identifying a source of an attack that sends out unauthorized data, and
   wherein the the processor is further configured to determine whether the whitelist has specific normal information having a source or destination that matches the source of an attack, and
   wherein the processor is further configured to, when determining that the specific normal information is registered in the whitelist, delete the specific normal information from the whitelist.

7. The relay apparatus according to claim 6,
   wherein the attack information includes a degree of importance of a defense against attack from the source of an attack, and
   wherein the processor is further configured to, when determining that the specific normal information is registered in the whitelist and when the degree of importance is equal to or greater than a threshold value, delete the specific normal information from the whitelist.

8. The relay apparatus according to claim 1,
   wherein the storage stores therein attack information identifying a source of an attack that sends out unauthorized data,
   wherein the whitelist associates information indicating that the packet is to be discarded with the normal information,
   wherein the processor is further configured to, when determining that first normal information for the first data is not registered in the whitelist, rewrite the first remaining lifespan required for the first data to arrive the destination to the information indicating that the packet is to be discarded,
   wherein the transmitter discards the first data that has gone through a process of the processor to write in the information indicating the packet is to be discarded,
   wherein the processor is further configured to determine whether the whitelist has specific normal information having a sender or destination that matches the source of an attack; and
   wherein the processor is further configured to, when the whitelist has the specific normal information, rewrite, to a specific lifespan, the information indicating the packet to be discarded associated with the specific normal information,
   wherein the receiver receives second data having the same destination and source as the first data, wherein the processor is further configured to determine whether second normal information for the second data received by the receiver is registered in the whitelist as the specific normal data or not;

wherein the processor is further configured to, when the determining that second normal information for the second data is registered in the whitelist, rewrite a second remaining lifespan required for the second data to arrive the destination to the specific lifespan from the relay apparatus, and wherein the transmitter transmits the second data that has gone through a rewriting process by the processor.

9. The relay apparatus according to claim 8, wherein the attack information includes a degree of importance of a defense against attack from the source of an attack, and wherein the processor is further configured to, when determining that second normal information for the second data is registered in the whitelist and when the degree of importance is smaller than a threshold value, rewrite the second remaining lifespan required for the second data to arrive the destination to the specific lifespan from the relay apparatus.

* * * * *